(12) United States Patent
Takada et al.

(10) Patent No.: US 12,175,016 B2
(45) Date of Patent: Dec. 24, 2024

(54) IMAGE DISPLAY DEVICE AND IMAGE DISPLAY SYSTEM

(71) Applicant: SONY GROUP CORPORATION, Tokyo (JP)

(72) Inventors: Masahiro Takada, Tokyo (JP); Teppei Imamura, Tokyo (JP); Ryo Ogawa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/260,366

(22) PCT Filed: Dec. 13, 2021

(86) PCT No.: PCT/JP2021/045823
§ 371 (c)(1),
(2) Date: Jul. 5, 2023

(87) PCT Pub. No.: WO2022/153759
PCT Pub. Date: Jul. 21, 2022

(65) Prior Publication Data
US 2024/0053822 A1 Feb. 15, 2024

(30) Foreign Application Priority Data
Jan. 14, 2021 (JP) .................. 2021-004263

(51) Int. Cl.
*G09G 5/00* (2006.01)
*G02B 27/01* (2006.01)
*G06F 3/01* (2006.01)

(52) U.S. Cl.
CPC ......... *G06F 3/013* (2013.01); *G02B 27/0172* (2013.01); *G02B 2027/0174* (2013.01)

(58) Field of Classification Search
CPC ............... G02B 27/0093; G02B 27/01; G02B 27/0103; G02B 27/0172;
(Continued)

(56) References Cited

U.S. PATENT DOCUMENTS 5,601,352 A * 2/1997 Okamura ............. H04N 9/3173
353/31
7,889,244 B2 * 2/2011 Tsukizawa ............. G06F 3/012
348/222.1
(Continued)

FOREIGN PATENT DOCUMENTS

JP 04-100088 A 4/1992
JP 08-043760 A 2/1996
(Continued)

OTHER PUBLICATIONS

International Search Report and Written Opinion of PCT Application No. PCT/JP2021/045823, issued on Feb. 1, 2022, 12 pages of ISRWO.
(Continued)

*Primary Examiner* — Joe H Cheng
(74) *Attorney, Agent, or Firm* — CHIP LAW GROUP

(57) ABSTRACT

Provided is a head-mounted image display device 100 including an image acquisition unit 104 that acquires a positional relationship image from which a positional relationship between a pupil position of an eyeball of a user and a visually recognizable region of the user can be estimated and a projection system 103 onto which incident light is projected, and the visually recognizable region is a focal position of the projection system 103. Further, the image display device 100 includes an imaging element, and the imaging element acquires the three-dimensional positional relationship image.

18 Claims, 6 Drawing Sheets

(58) Field of Classification Search
CPC .... G02B 2027/0138; G02B 2027/0174; G02B 2027/0178; G06F 3/013
See application file for complete search history.

(56) References Cited

U.S. PATENT DOCUMENTS

| | | | |
|---|---|---|---|
| 10,820,795 B1 | 11/2020 | Weise | |
| 11,243,609 B2* | 2/2022 | Ogasawara | G09G 3/002 |
| 11,929,006 B2* | 3/2024 | Ogawa | G06F 3/013 |
| 11,940,630 B2* | 3/2024 | Imamura | A61B 3/102 |
| 2013/0235169 A1 | 9/2013 | Kato | |
| 2014/0172432 A1* | 6/2014 | Sendai | G02B 27/0172 704/276 |
| 2014/0375680 A1 | 12/2014 | Ackerman | |
| 2016/0170283 A1 | 6/2016 | Kim | |
| 2016/0313561 A1* | 10/2016 | Chenchev | G02B 27/0172 |
| 2016/0313973 A1* | 10/2016 | Yajima | G06F 3/165 |
| 2017/0161957 A1* | 6/2017 | Yajima | G06V 20/20 |
| 2019/0333480 A1 | 10/2019 | Lang | |
| 2020/0326543 A1 | 10/2020 | Kim et al. | |
| 2021/0018751 A1* | 1/2021 | Shmunk | G02B 27/0179 |
| 2022/0329772 A1* | 10/2022 | Otsuka | H04N 19/30 |
| 2022/0345721 A1* | 10/2022 | Otsuka | H04N 19/17 |

FOREIGN PATENT DOCUMENTS

| | | | |
|---|---|---|---|
| JP | 2003-029198 A | | 1/2003 |
| JP | 2003-079577 A | | 3/2003 |
| JP | 2009151065 A | * | 7/2009 |
| JP | 2010085786 A | * | 4/2010 |
| JP | 2017-129755 A | | 7/2017 |
| JP | 2017135605 A | * | 8/2017 |
| JP | 2019-512726 A | | 5/2019 |
| WO | 2017/183582 A1 | | 10/2017 |
| WO | 2019/207350 A1 | | 10/2019 |

OTHER PUBLICATIONS

Jonghyun Kim, EL, "Foveated AR: Dynamically-Foveated Augmented Reality Display", ACM Transactions on Graphics, vol. 38, No. 4, Jul. 12, 2019 (Jul. 12, 2019), pp. 1-15, XP058685606.

G. A. Koulieris, et al, "Near-Eye Display and Tracking Technologies for Virtual and Augmented Reality", Computer Graphics Forum: Journal of the European Association for Computer Graphics, vol. 38, No. 2, Jun. 7, 2019 (Jun. 7, 2019), pp. 493-519, XP071545475.

Rolf R. Hainich, et al, "NearEye Displays", In: Displays: Fundamentals and Applications, Jul. 5, 2011 (Jul. 5, 2011), CRC Press, XP055505261, ISBN: 978-1-56881-439-1, pp. 439-503.

* cited by examiner

FIG. 5
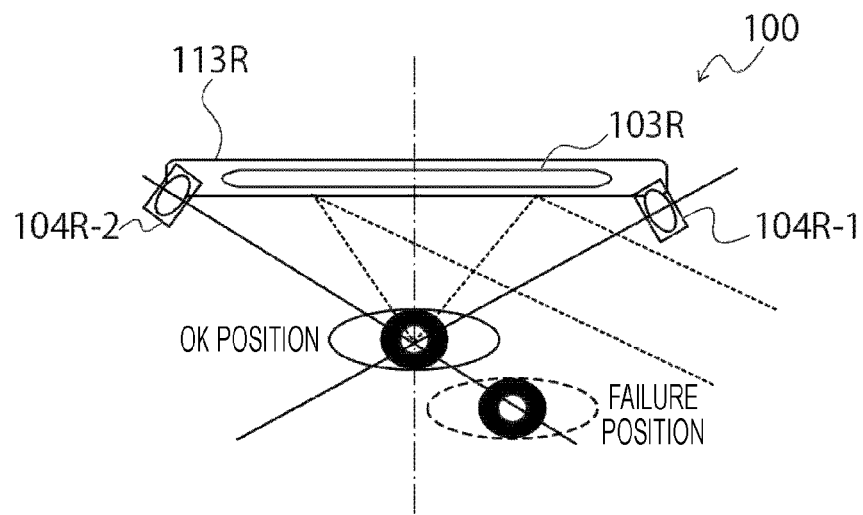
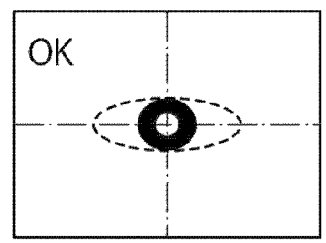
FIG. 6A
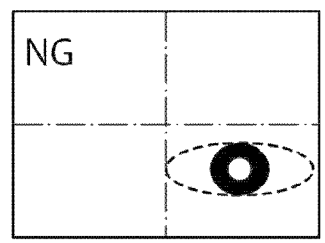
FIG. 6B
FIG. 6C
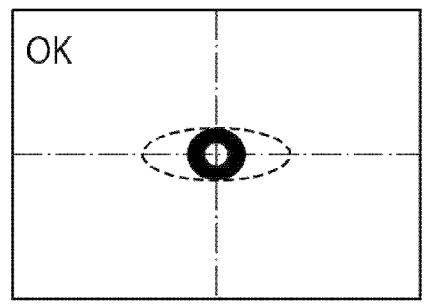

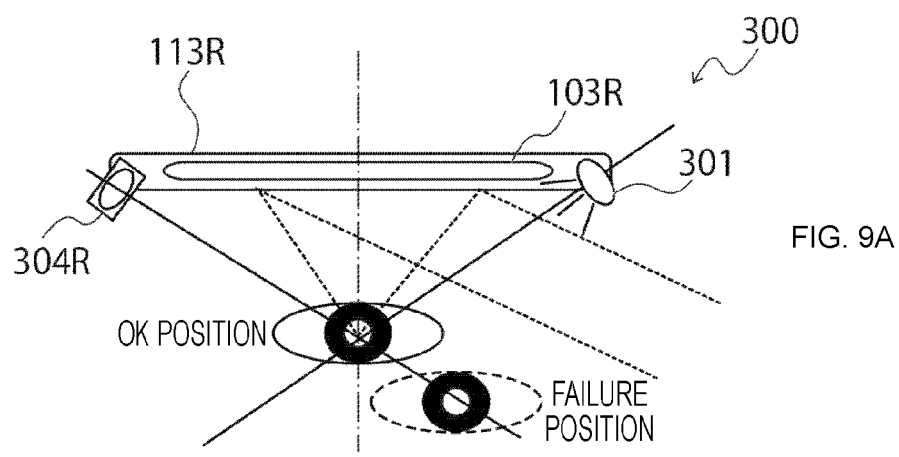
FIG. 9A
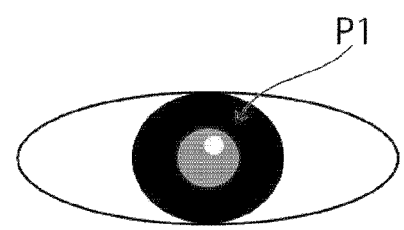
FIG. 9B
FIG. 10
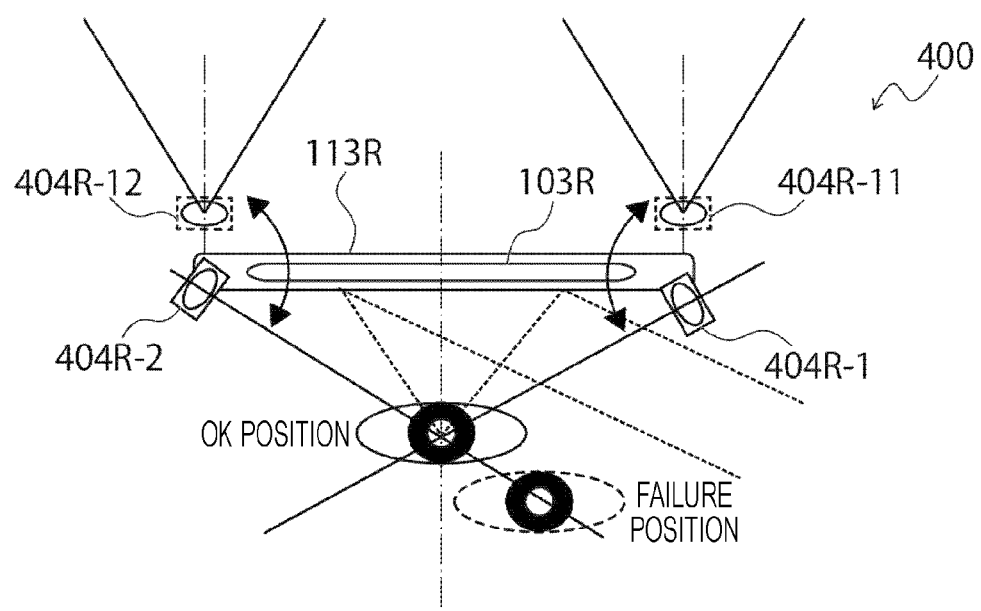

IMAGE DISPLAY DEVICE AND IMAGE DISPLAY SYSTEM

CROSS REFERENCE TO RELATED APPLICATIONS

This application is a U.S. National Phase of International Patent Application No. PCT/JP2021/045823 filed on Dec. 13, 2021, which claims priority benefit of Japanese Patent Application No. JP 2021-004263 filed in the Japan Patent Office on Jan. 14, 2021. Each of the above-referenced applications is hereby incorporated herein by reference in its entirety.

TECHNICAL FIELD

The present technology relates to an image display device and an image display system, and more particularly to a head-mounted image display device and image display system capable of adjusting a mounting position when the image display device is mounted on a head of a user.

BACKGROUND ART

Conventionally, it has been known that a head-mounted display (HMD), which is an example of a head-mounted image display device, uses an image display method using a retinal direct-drawing method (Maxwell view). For example, Patent Document 1 discloses a direct-view image display device that displays an image on a retina of an eye by using laser light.

Such the retinal direct-drawing method directly projects an image onto the retina with a bundle of thin light beams (beam diameter). Thus, it is possible to visually recognize an image in focus, regardless of "eyesight" which is a focus adjustment ability of a cornea. Therefore, in a case where the retina functions, it is possible to view video even with amblyopia that is decreased vision.

However, the retinal direct-drawing method has a problem in narrowness of an eyebox that serves as a visually recognizable region when an eyeball is placed, and it is necessary to physically match a focal position of a projection system that collects a bundle of light beams of a display image with a pupil position. In order to move an image display position, it is necessary to three-dimensionally move the focal position of the projection system to move the focal position in the horizontal direction, the vertical direction, and the depth direction within the XYZ plane. As described above, the HMD using the retinal direct-drawing method has a problem that the entire image cannot be viewed unless the user wears the HMD such that the center of the pupil of the user comes to a design eyebox position of the HMD.

Meanwhile, there is known a technique of detecting a line-of-sight of eye movement in a line-of-sight interface that operates a computer by using the line-of-sight. As a general method, there is a method of acquiring the center of the pupil and a Purkinje image of an illumination light source by using an imaging camera and detecting a line-of-sight direction by image processing. For example, Patent Document 2 discloses a technique of detecting an accurate line-of-sight by adding complicated correction means when detecting the line-of-sight by using a Purkinje image.

Further, as a line-of-sight detection method, there is also known a method of detecting a change in an amount of reflected light of infrared illumination light or the like from the eyeball by using a photodiode (PD). For example, Patent Document 3 discloses a technique of detecting a change in an amount of reflected light from the eyeball by using a plurality of PDs on a frame to detect a moving direction of a line-of-sight on the basis of a signal of the sum of or difference of outputs from the respective PDs.

Further, there is known a method of displaying a highly corrected image by correcting a display image in a case where mounting displacement occurs in an eyeglass-type image display device. For example, Patent Document 4 discloses a technique of, when mounting displacement occurs within a range of the eyebox in an HMD using a virtual image method, correcting a projection state (image quality such as luminance) of a display image to display an image with high image quality. In a case of an eyewear using the virtual image method, the eyebox is generally designed to be larger than the pupil diameter, and thus, in a case where the pupil is present in the eyebox, it is possible to view an entire range of a display image, and the eyewear is tolerant to displacement of an initial mounting position. Therefore, the image quality may deteriorate, but the image can be viewed as long as the pupil is present within a range of the eyebox.

Further, there is known a method of accurately adjusting a mounting position in a case where a display position of an image is displaced in the depth direction. For example, Patent Document 5 discloses a technique of displaying an image on left and right display units of an HMD to cause a wearer himself/herself to adjust a position thereof in the depth direction on the basis of an amount of displacement or a degree of blurring.

CITATION LIST

Patent Document

Patent Document 1: Japanese Patent Application Laid-Open No. 4-100088
Patent Document 2: Japanese Patent Application Laid-Open No. 2003-79577
Patent Document 3: Japanese Patent Application Laid-Open No. 2003-29198
Patent Document 4: Japanese Patent Application Laid-Open No. 2017-135605
Patent Document 5: Japanese Patent Application Laid-Open No. 2017-129755

SUMMARY OF THE INVENTION

Problems to be Solved by the Invention

However, the technique of analyzing an image, which is disclosed in Patent Document 2, has the following problem: in a case where the HMD is displaced from the most favorable design position when the HMD is mounted, the displacement needs to be corrected by initial calibration, but, because the position deviates from an ideal condition, detection accuracy is reduced even in a case where the displacement is corrected, and thus it is necessary to maintain a correct design mounting position as much as possible.

Further, the technique of Patent Document 3 can detect the line-of-sight with light weight, small size, and fast response, but has a problem that an error occurs when a positional relationship between the eyeball and the PDs on the frame is different from a design value. Further, because image information is not used, it is impossible to determine whether the eyeball rotationally moves or positions of the head and the frame of the HMD are displaced, that is, a mounting state is displaced. Furthermore, a direction of displacement and an amount of displacement are not known and thus cause an error. In the worst case, the image cannot be viewed.

Further, the technique of Patent Document 4 has a problem that a field of view is missing in a case where the HMD of the retinal direct-drawing method using the Maxwell view is used or in a case where the eyebox is not sufficient for the pupil diameter even in a case where the virtual image method is adopted.

Further, the technique of Patent Document 5 has a problem that a wearer cannot appropriately wear the HMD in a case where the wearer cannot recognize displacement itself due to amblyopia, lack of judgment, or the like.

Therefore, a main object of the present technology is to provide a head-mounted image display device capable of guiding a mounting state of the image display device to a visually recognizable region that is a correct design position.

Solutions to Problems

A head-mounted image display device according to the present technology includes an image acquisition unit that acquires a positional relationship image from which a positional relationship between a pupil position of an eyeball of a user and a visually recognizable region of the user can be estimated. The image display device according to the present technology may further include a projection system onto which incident light is projected, in which the visually recognizable region may be a focal position of the projection system. Further, the image display device according to the present technology may include: a mounting displacement determination unit that determines an amount and/or direction of displacement from a correct mounting state on the basis of information from the positional relationship image; and an information presentation unit that presents mounting position adjustment information to a user or a wearing assistant on the basis of a determination result by the mounting displacement determination unit.

An image display method may be a retinal direct-drawing method or a virtual image method in which a size of the visually recognizable region is substantially the same as a size of a pupil diameter. The image acquisition unit may include an imaging element, and the imaging element may acquire the three-dimensional positional relationship image. The image display device according to the present technology may further include a light source arranged at a position symmetrical to the imaging element with respect to the visually recognizable region. The imaging element may have a function of switching an imaging range. The image acquisition unit may include a plurality of imaging elements, and optical axes of the imaging elements may intersect each other in the visually recognizable region.

The image display device according to the present technology may further include a line-of-sight detection unit that detects a line-of-sight of the user. The line-of-sight detection unit may detect the line-of-sight of the user by an imaging method or a photodiode method. Further, the image display device according to the present technology may further include a holographic optical element that diffracts or transmits incident light, in which the line-of-sight detection unit may detect the line-of-sight of the user by the photodiode method.

The image display device may further include a line-of-sight tracking unit that tracks the line-of-sight of the user or may further include a feedback control unit that feeds back information based on the positional relationship image. The line-of-sight detection unit may correct an amount of mounting displacement on the basis of a feedback signal acquired from the feedback control unit. The line-of-sight tracking unit may track the line of sight by receiving a feedback signal in which an amount of mounting displacement has been corrected from the feedback control unit.

A shape of the image display device may be any one of an eyeglass type, a goggle type, a helmet type, a monocular type, and a binocular type. Further, the information presentation unit can also issue an instruction regarding the mounting state by presenting information such as video or sound at a time of wearing and during wearing. Furthermore, the image display device according to the present technology can be used in an image display system including an information presentation device that presents operation assistance information using the image display device.

Effects of the Invention

The present technology can provide a head-mounted image display device capable of guiding a mounting state of the image display device to a visually recognizable region that is a correct design position. Note that the above effects are not necessarily limited, and any of the effects described in the present specification or other effects that can be grasped from the present specification may be exhibited in addition to or in place of the above effects.

BRIEF DESCRIPTION OF DRAWINGS

FIG. 5 is a schematic diagram illustrating a configuration example of an optical system of the image display device according to the first embodiment of the present technology.

FIGS. 6A, 6B, and 6C is a are schematic diagrams illustrating a focal position adjustment function of the image display device according to the first embodiment of the present technology.

FIGS. 9A and 9B are schematic diagrams illustrating a configuration example of an optical system of an image display device according to a third embodiment of the present technology.

FIG. 10 is a schematic diagram illustrating a configuration example of an optical system of an image display device according to a fourth embodiment of the present technology.

MODE FOR CARRYING OUT THE INVENTION

Figure 1:
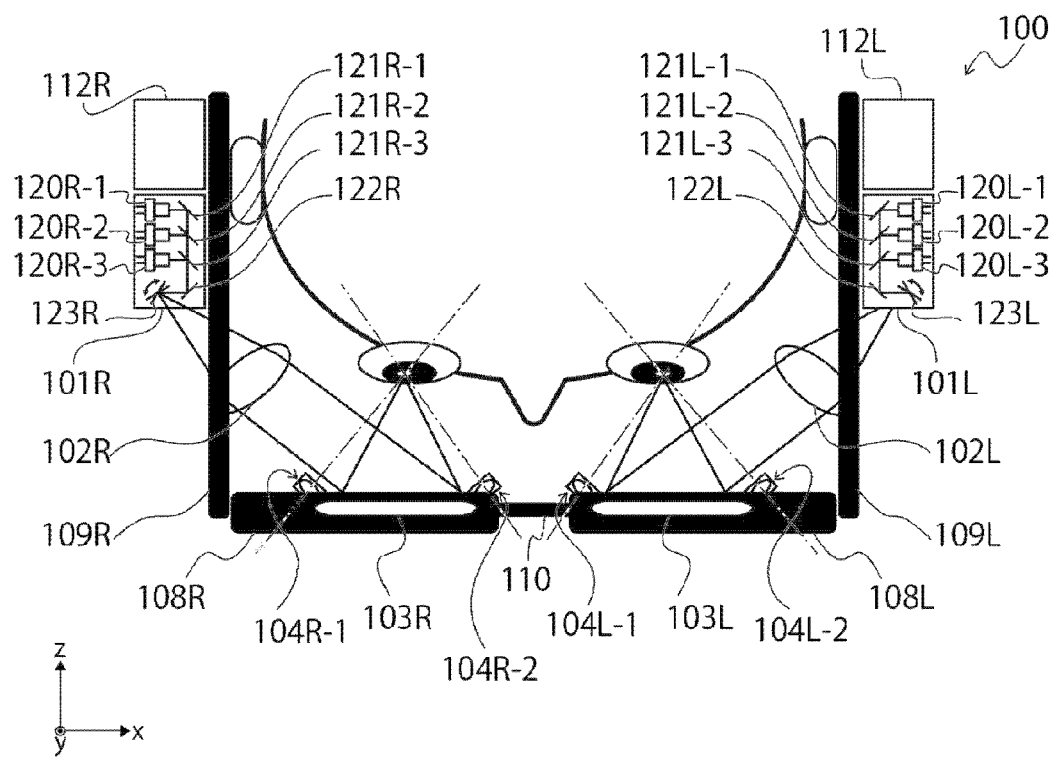
FIG. 1 is a top view illustrating a configuration example of an image display device according to a first embodiment of the present technology.

Hereinafter, preferred modes for carrying out the present technology will be described with reference to the drawings. The embodiments described below show an example of a representative embodiment of the present technology, and any embodiments can be combined. Further, the scope of the present technology is not narrowly construed based on the embodiments. Note that description will be provided in the following order.
1. First embodiment
   (1) Configuration example of image display device 100
   (2) Block configuration example of image display device 100
   (3) Overview of retinal direct-drawing method
   (4) Example of focal position adjustment function of image display device 100
   (5) Mounting operation example of image display device 100
2. Second embodiment
3. Third embodiment
4. Fourth embodiment
5. Fifth embodiment
6. Sixth embodiment
7. Seventh embodiment
8. Eighth embodiment
9. Ninth embodiment
10. Tenth embodiment
11. Eleventh embodiment
12. Twelfth embodiment
13. Thirteenth embodiment
14. Fourteenth embodiment
15. Other configurations
16. Hardware configuration example

1. First Embodiment (1) Configuration Example of Image Display Device 100

Figure 2:
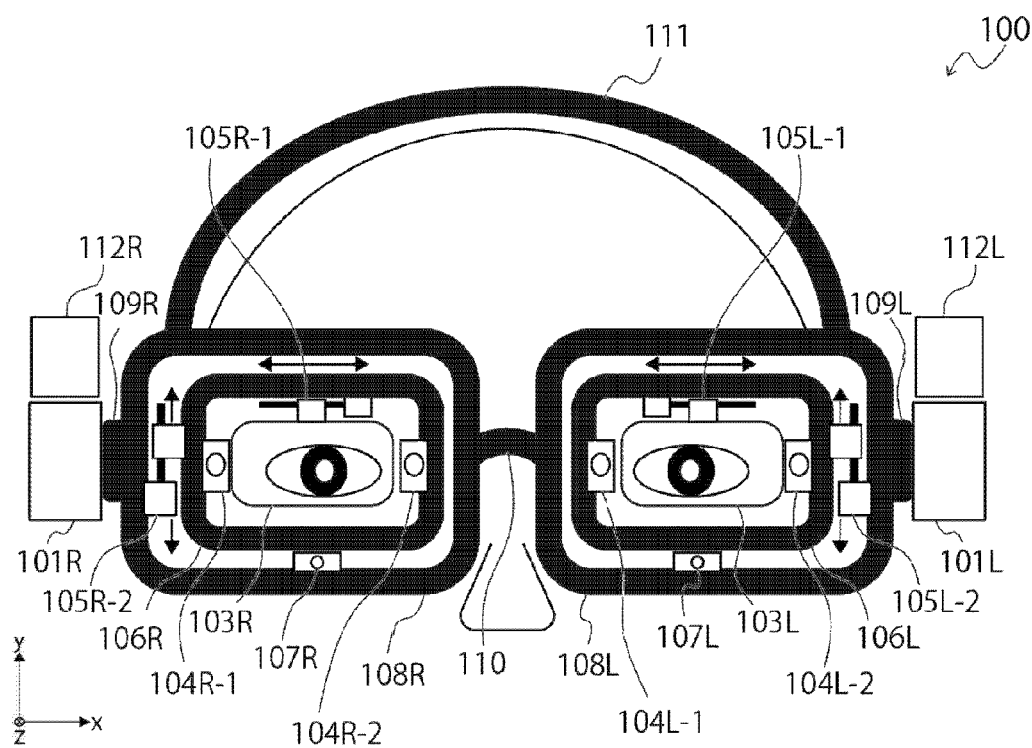
FIG. 2 is a front view illustrating the configuration example of the image display device according to the first embodiment of the present technology.

First, a configuration example of an image display device 100 according to a first embodiment of the present technology will be described with reference to FIGS. 1 and 2. FIG. 1 is a top view illustrating the configuration example of the image display device 100 mounted on a head of a user. FIG. 2 is a front view illustrating the configuration example of the image display device 100 mounted on the head of the user. Note that an image display method of the image display device 100 can use a retinal direct-drawing method or a virtual image method in which a size of a visually recognizable region is substantially the same as a size of a pupil diameter.

As illustrated in FIG. 1, the image display device 100 has an eyeglass shape and projects video display light (also referred to as image display light) onto each of both eyes. That is, the image display device 100 includes a video display unit that projects video display light (also referred to as image display unit) onto the left eye and a video display unit that projects video display light onto the right eye. The video display unit that projects video display light onto the left eye includes a light source unit 101L, a projection optical system 102L, and a holographic optical element (hereinafter, also referred to as HOE) 103L serving as a projection system onto which incident light is projected.

Although not illustrated, a combiner may be included in the image display device 100 as a tracking unit, and the combiner may structurally include a holographic optical element 103L that diffracts or transmits incident light, a one-way mirror, and the like. A relay system driving unit (not illustrated) serving as the tracking unit may be included in the projection optical system 102L. Although not illustrated, a mirror driving unit and a phase difference panel, which serve as the tracking units, may be provided between the light source unit 101L and the projection optical system 102L or between the projection optical system 102L and the holographic optical element 103L.

The light source unit 101L emits video display light. As a configuration for emitting the video display light, the light source unit 101L can include, for example, a plurality of laser light sources 120L-1 to 120L-3, a plurality of reflective mirrors 121L-1 to 121L-3, a reflective mirror 122L, and a scanning mirror 123L. Laser light emitted from the laser light sources 120L-1 to 120L-3 is reflected by the reflective mirrors 121L-1 to 121L-3 and the reflective mirror 122L and reaches the scanning mirror 123L. The scanning mirror 123L two-dimensionally scans the laser light. The scanning mirror 123L may be, for example, a MEMS mirror. The scanning mirror 123L can move a direction of the laser light at a high speed so as to form an image on the retina.

The projection optical system 102L adjusts a direction of the video display light such that the video display light reaches a desired region and/or position of the holographic optical element (HOE) 103L. For example, the video display light scanned by the scanning mirror 123L is converted into parallel light.

The HOE 103L diffracts the video display light so as to collect the video display light near the pupil of the user and emit the video display light to the retina. The HOE 103L may be, for example, a reflective diffraction element. The HOE 103L can have an optical characteristic of functioning as a lens for light within a wavelength range of the video display light and transmitting light having a wavelength outside the wavelength range. With the optical characteristic, the user can recognize, for example, a landscape ahead in the line-of-sight direction via the HOE 103L and can recognize an image formed by the video display light. That is, the image formed by the video display light can be superimposed on the landscape of the outside world.

Examples of the HOE 103L can include a hologram lens, preferably a film-shaped hologram lens, and more preferably a transparent film-shaped hologram lens. The film-shaped hologram lens may be used by being attached to, for example, glass or the like. A desired optical characteristic can be imparted to the hologram lens by techniques known in the technical field. Further, the HOE 103L may be, for example, a volume hologram or a surface relief hologram. Furthermore, a commercially available hologram lens may be used as the hologram lens, or the hologram lens may be manufactured by a technique known in the technical field.

As described above, the light source unit 101L, the projection optical system 102L, and the HOE 103L cause the video display light to reach the left eye of the user.

The image display device 100 has a temple portion 109L and an outer rim portion 108L serving as a part of the eyeglass shape. The light source unit 101L and the projection optical system 102L are arranged on the temple portion 109L. The HOE 103L is held by the outer rim portion 108L. More specifically, the HOE 103L is held by an inner rim portion 106L via a line-of-sight tracking unit 105L-1 that tracks the line-of-sight of the user, and the inner rim portion 106L is held by the outer rim portion 108L via a line-of-sight tracking unit 105L-2 that tracks the line-of-sight of the user.

Examples of the line-of-sight tracking units 105L-1 and 105L-2 can include an actuator, a piezoelectric element, and a bimetal.

The video display unit that projects video display light onto the right eye of the user includes a light source unit 101R, a projection optical system 102R, and an HOE 103R serving as the projection system. Although not illustrated, a combiner may be included in the image display device 100 as the tracking unit, and the combiner may structurally include the HOE 103R, a one-way mirror, and the like. A relay system driving unit (not illustrated) serving as the tracking unit may be included in the projection optical system 102R. Although not illustrated, a mirror driving unit and a phase difference panel, which serve as the tracking units, may be provided between the light source unit 101R and the projection optical system 102R or between the projection optical system 102R and the HOE 103R.

The description of the light source unit 101L, the projection optical system 102L, and the HOE 103L also applies to the light source unit 101R, the projection optical system 102R, and the HOE 103R.

As in the video display unit for the left eye, the light source unit 101R and the projection optical system 102R are arranged on a temple portion 109R. The HOE 103R is held by an outer rim portion 108R. More specifically, the HOE 103R is held by an inner rim portion 106R via a line-of-sight tracking unit 105R-1 that tracks the line-of-sight of the user, and the inner rim portion 106R is held by the outer rim portion 108R via a line-of-sight tracking unit 105R-2 that tracks the line-of-sight of the user.

The outer rim portions 108L and 108R of the image display device 100 are connected to each other via a bridge portion 110. The bridge portion 110 is a portion that is put on the nose of the user when the user wears the image display device 100. Further, both the outer rim portions 108L and 108R of the image display device 100 are connected to a headband portion 111. As illustrated in FIG. 2, the headband portion 111 is a portion that comes into contact with the top of the head of the user when the user wears the image display device 100.

The light source unit 101L in FIG. 1 includes the three laser light sources 120L-1 to 120L-3, but the number of laser light sources included in the light source unit 101L may be one, two, or four or more. The plurality of laser light sources may output laser beams having different wavelengths. Similarly, the light source unit 101R includes the three laser light sources 120R-1 to 120R-3, but the number of laser light sources included in the light source unit 101R may be one, two, or four or more. The plurality of laser light sources may output laser beams having different wavelengths. By using the laser light sources 120L-1 to 120L-3 and the laser light sources 120R-1 to 120R-3, a stimulus of a specific wavelength can be presented.

Although not illustrated, the image display device 100 may further include a wavelength dispersion compensation member. The wavelength dispersion compensation member is, for example, a reflection or transmission volume hologram, a reflection or transmission relief hologram, a first optical element including a metasurface, or the like. The wavelength dispersion compensation member may be provided around the reflective mirror 122L and/or 122R, for example, between the reflective mirror 122L and the scanning mirror 123L and/or between the reflective mirror 122R and the scanning mirror 123R. When the wavelength dispersion compensation member is used for the image display device 100, it is possible to accurately stimulate a predetermined point or arbitrary point on the retina because wavelength dispersion is compensated.

The image display device 100 further includes cameras 104L-1, 104L-2, 104R-1, and 104R-2 as examples of an image acquisition unit that acquires a positional relationship image from which a positional relationship between a pupil position of an eyeball of the user and a visually recognizable region of the user can be estimated. Note that, in the present specification, the cameras 104L-1, 104L-2, 104R-1, and 104R-2 may be collectively referred to as the image acquisition unit 104. The visually recognizable region can be a focal position of the projection system onto which incident light is projected.

The camera 104L-1, 104L-2, 104R-1 and 104R-2 includes an imaging element, and the imaging element acquires a three-dimensional positional relationship image. Further, the camera 104L-1, 104L-2, 104R-1 and 104R-2 can also include a plurality of imaging elements, and optical axes of the plurality of imaging elements can intersect each other in the visually recognizable region.

The image display device 100 includes line-of-sight detection units 107L and 107R that detect the line-of-sight of the user. In the present specification, the line-of-sight detection units 107L and 107R may be collectively referred to as the line-of-sight detection unit 107. The line-of-sight detection unit 107 can detect the line-of-sight of the eyeball by using corneal reflex or fundus reflex. Because the image display device 100 includes the line-of-sight detection unit 107, a position of an image to be presented to the user can be adjusted to a more appropriate position. For example, in a case where an image presented by the image display device 100 is superimposed on an image of the outside world, it is possible to display the image at a more appropriate position by detecting the line-of-sight of the user. That is, it is preferable to include the line-of-sight detection unit 107 for presentation of AR information.

The line-of-sight detection unit 107 may use an imaging method or a photodiode (PD) method as an example. In particular, in a case where the image display device 100 includes the HOE 103 that diffracts or transmits incident light, the line-of-sight detection unit 107 can detect the line-of-sight of the user by the photodiode method. The line-of-sight detection unit 107 may include a combination of a light source and a camera or a combination of a light source and a photodetector (PD) as an example. Hereinafter, the line-of-sight detection unit 107 will be described in more detail.

The line-of-sight detection unit 107L detects the line-of-sight of the left eye of the user. The line-of-sight detection unit 107L may be provided at, for example, any position of the outer rim portion 108L, but may be provided at, for example, any position of another component such as the inner rim portion 106L as long as the line-of-sight detection unit can detect the line-of-sight of the left eye.

The line-of-sight detection unit 107L may be, for example, a line-of-sight detection unit of the photodiode method. The line-of-sight detection unit of the photodiode method can include, for example, a combination of a light source and a photodiode. The light source irradiates the left eye with light. The light source is preferably an infrared-light illumination light source. This makes it possible to prevent the light source from affecting recognition of the image of the outside world and recognition of video display light by the user.

The photodiode detects reflected light from the eyeball of light (in particular, infrared light) emitted from the light source. The photodiode can detect, for example, a difference between an amount of reflected light in an iris (pupil) and an amount of reflected light in white of the eye (sclera). The line-of-sight detection unit of the photodiode method can detect the line-of-sight on the basis of, for example, an area ratio of the iris and an area ratio of the white of the eye detected by the photodiode.

The line-of-sight detection unit of the photodiode method cannot detect mounting displacement even in a case where the mounting displacement occurs. Therefore, in a case where the mounting displacement occurs, line-of-sight detection accuracy of the line-of-sight detection unit may decrease. As described above, the image display device 100 includes the camera 104L-1, 104L-2, 104R-1 and 104R-2 that acquires the positional relationship image from which the positional relationship between the pupil position of the eyeball of the user and the visually recognizable region of the user can be estimated. Therefore, the mounting displacement can be detected. By correcting the line-of-sight on the basis of the mounting displacement detected by the camera 104L-1, 104L-2, 104R-1 and 104R-2, the line-of-sight detection accuracy by the line-of-sight detection unit 107 is improved. The image display device 100 can detect the line-of-sight with accuracy of, for example, 3 mm or less, particularly 2 mm or less, and more particularly 1 mm or less. The line-of-sight detection with such accuracy is particularly preferable for presentation of an image by the Maxwell view.

Alternatively, the line-of-sight detection unit 107L may be a line-of-sight detection unit of the imaging method. The line-of-sight detection unit of the imaging method can include, for example, a combination of a light source and an imaging element. The light source irradiates the left eye with light as in the case of the photodiode method. The light source is preferably an infrared-light illumination light source. The imaging element may obtain, for example, an image from which a reflected image (so-called Purkinje image) of the light source in the eyeball (in particular, cornea) and the center of gravity of the pupil can be acquired. The imaging element may be, for example, an infrared imaging element. The line-of-sight detection unit of the imaging method can estimate the optical axis of the eyeball on the basis of, for example, the Purkinje image and the image. The line-of-sight detection unit can detect the line-of-sight by converting the estimated optical axis into a visual axis.

In the line-of-sight detection based on the Purkinje image and the image, in a case where the positional relationship between the light source and the eyeball is fixed, a position where the Purkinje image is formed is fixed. The mounting displacement may cause displacement in the positional relationship. This may change the position where the Purkinje image is formed. Further, the line-of-sight detection is easily affected by blinking, hair, eyelashes, or the like. Furthermore, calibration for correcting individual differences is normally performed in the line-of-sight detection, but, in a case where the mounting displacement occurs, the calibration needs to be performed again.

As described above, the image display device 100 includes the camera 104L-1, 104L-2, 104R-1 and 104R-2 that acquires the positional relationship image from which the positional relationship between the pupil position of the eyeball of the user and the visually recognizable region of the user can be estimated. Therefore, the mounting displacement can be detected. Therefore, for example, a correction value corresponding to the amount of mounting displacement is prepared in advance and is stored in a storage unit or the like, and correction is performed by using the correction value when the mounting displacement occurs. This makes it possible to detect the line-of-sight with high accuracy. Further, the detection of the mounting displacement is hardly affected by blinking, hair, eyelashes, or the like. Furthermore, the number of times of calibration can be reduced by performing correction based on the detected mounting displacement.

The projection system included in the image display device 100 can further include the line-of-sight tracking units 105L-1, 105L-2, 105R-1, and 105R-2 that adjust a projection position of video display light emitted from the image display device 100 and track the line-of-sight of the user. Note that, in the present specification, the four line-of-sight tracking units may be collectively referred to as the line-of-sight tracking unit 105. The line-of-sight tracking unit 105 may track the line-of-sight to adjust the projection position of the video display light, for example. The line-of-sight tracking unit 105 can adjust the projection position of the video display light according to the mounting displacement.

Further, the line-of-sight tracking unit 105 can adjust the projection position of the video display light according to rotational movement of the eyeball or movement of the line-of-sight. For example, because the image display device 100 includes the line-of-sight tracking unit 105, the position of the image to be presented to the user can be adjusted to a more appropriate position. For example, in a case where an image presented by the image display device 100 is superimposed on an image of the outside world, it is possible to display the image at a more appropriate position by detecting the line-of-sight of the user. That is, it is preferable to include the line-of-sight detection unit 107 for presentation of AR information. Further, the line-of-sight detection unit 107 can adjust a position where the video display light is collected in image display by the Maxwell view.

The line-of-sight tracking units 105L-1 and 105L-2 adjust the projection position of the video display light projected onto the left eye. The line-of-sight tracking unit 105L-1 adjusts a positional relationship between the inner rim portion 106L and the outer rim portion 108L in the Y-axis direction. For example, the line-of-sight tracking unit 105L-1 moves the inner rim portion 106L in the Y-axis direction with respect to the outer rim portion 108L. Therefore, the position of the HOE 103L in the Y-axis direction is adjusted.

The line-of-sight tracking unit 105L-2 adjusts a positional relationship between the HOE 103L and the inner rim portion 106L in the X-axis direction. For example, the line-of-sight tracking unit 105L-2 moves the HOE 103L in the X-axis direction with respect to the inner rim portion 106L. Therefore, the position of the HOE 103L in the X-axis direction is adjusted.

A drive element for driving the adjustment of the positional relationship between the inner rim portion 106L and the outer rim portion 108L in the Y-axis direction by the line-of-sight tracking unit 105L-1 may be, for example, a piezoelectric element, an actuator, or a bimetal, but is not limited thereto. The drive element for driving the adjustment of the positional relationship between the HOE 103L and the inner rim portion 106L in the X-axis direction by the line-of-sight tracking unit 105L-2 may also be, for example, a piezoelectric element, an actuator, or a bimetal, but is not limited thereto.

The line-of-sight tracking unit 105L-1 can adjust the positional relationship between the inner rim portion 106L and the outer rim portion 108L in the Y-axis direction on the basis of, for example, a change in the position of the image display device 100 detected by the camera 104L-1, 104L-2, 104R-1 and 104R-2. Further, the line-of-sight tracking unit 105L-1 may adjust the positional relationship on the basis of the change in the position and the line-of-sight detected by the line-of-sight detection unit 107L.

The line-of-sight tracking unit 105L-2 can adjust the positional relationship between the HOE 103L and the inner rim portion 106L in the X-axis direction on the basis of, for example, a change in the position of the image display device 100 detected by the camera 104L-1, 104L-2, 104R-1 and 104R-2. Further, the line-of-sight tracking unit 105L-2 may adjust the positional relationship on the basis of the change in the position and the line-of-sight detected by the line-of-sight detection unit 107L.

The line-of-sight tracking units 105R-1 and 105R-2 adjust the projection position of the video display light projected onto the right eye. The adjustment can be performed in a similar manner to the line-of-sight tracking units 105L-1 and 105L-2.

(2) Block Configuration Example of Image Display Device 100

Figure 3:
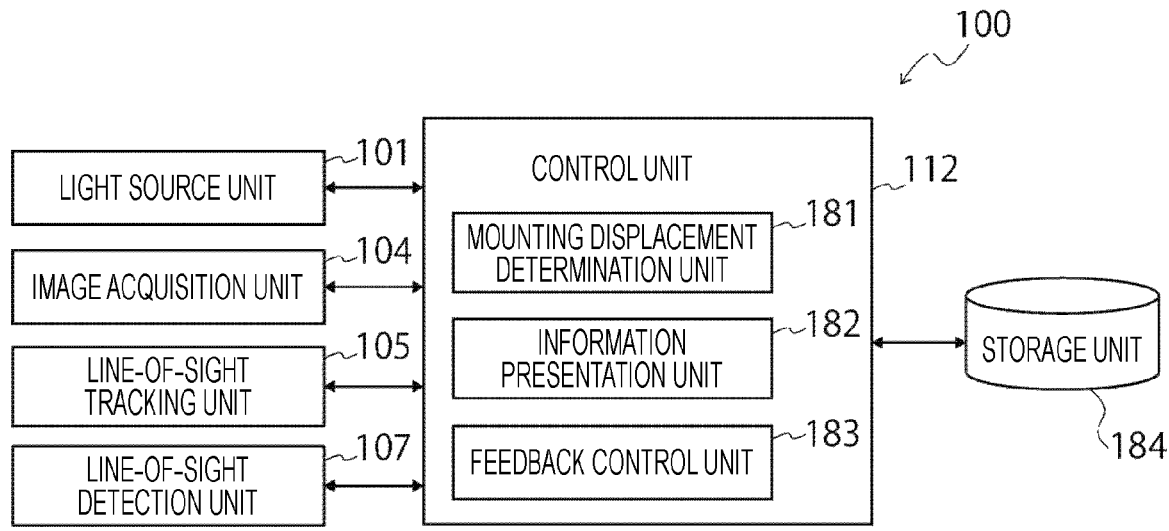
FIG. 3 is a block diagram illustrating the configuration example of the image display device according to the first embodiment of the present technology.

Next, a block configuration example of the image display device 100 according to the present embodiment will be described with reference to FIG. 3. FIG. 3 is a block diagram illustrating a main configuration example of the image display device 100.

As illustrated in FIG. 3, the image display device 100 includes a control unit 112. The control unit 112 includes a mounting displacement determination unit 181, an information presentation unit 182, and a feedback control unit 183.

Further, as described above, the image display device 100 in FIG. 3 includes the light source unit 101, the image acquisition unit 104, the line-of-sight tracking unit 105, and the line-of-sight detection unit 107. Note that the image display device 100 may include a projection system including a see-through member (e.g. reflection or transmission volume hologram, reflection or transmission relief hologram, or the like) provided in front of the eye. A storage unit 184 may be provided in the image display device 100 or may be provided in an external device other than the image display device 100.

The mounting displacement determination unit 181 determines an amount and/or direction of displacement from a correct mounting state on the basis of information from the positional relationship image. The information presentation unit 182 presents mounting position adjustment information to the user or a wearing assistant on the basis of a determination result by the mounting displacement determination unit 181.

The feedback control unit 183 feeds back information based on the positional relationship image. The line-of-sight detection unit 107 corrects the amount of mounting displacement on the basis of a feedback signal acquired from the feedback control unit 183. The line-of-sight tracking unit 105 tracks the line-of-sight by receiving a feedback signal in which the amount of mounting displacement has been corrected from the feedback control unit 183.

(3) Overview of Retinal Direct-Drawing Method

Figure 4:
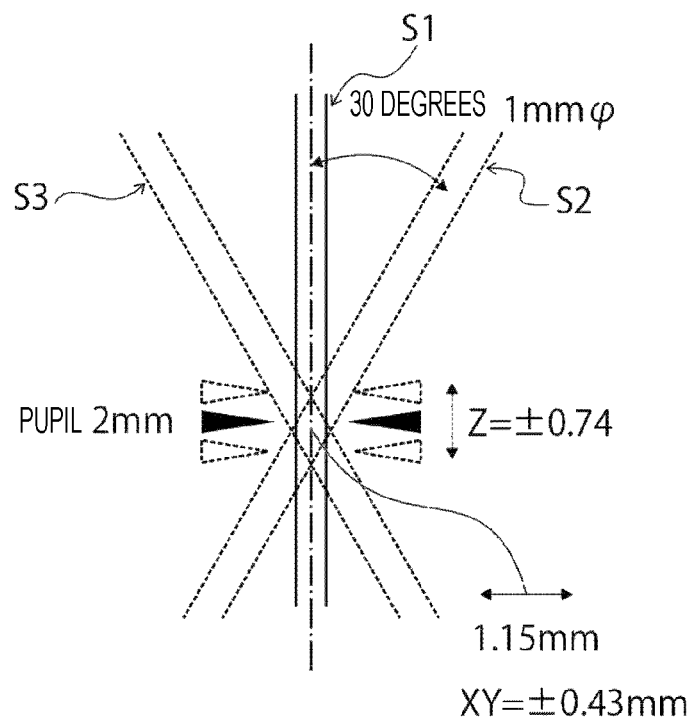
FIG. 4 is a schematic diagram illustrating a retinal direct-drawing method used in the image display device according to the first embodiment of the present technology.

Next, an overview of the retinal direct-drawing method used for the image display device 100 according to the present embodiment will be described with reference to FIG. 4. FIG. 4 is a schematic diagram illustrating the retinal direct-drawing method used for the image display device 100.

In an image display method using the retinal direct-drawing method (Maxwell view), the whole bundle of incident light beams needs to be captured by the pupil of the eye of the user. Therefore, it is necessary to place the pupil position at the focal position of the projection system with the following accuracy.

As illustrated in FIG. 4, for example, the pupil diameter in a bright place is 2 mm, and, in a case where laser beams S1, S2, and S3 having a beam diameter of 1 mm are incident on the pupil at an angle of view of ±30 degrees under this condition, a beam width is approximately 1.15 mm on the pupil. In this state, an allowable amount of displacement in which the entire angle of view can be visually recognized without missing is displacement of up to ±0.43 mm in the XY directions and displacement of up to ±0.74 mm in the depth Z direction. A total field of view of the image cannot be viewed out of the above range. Further, this condition becomes stricter as the angle of view becomes larger or the pupil becomes smaller (environment becomes brighter).

Further, in the retinal direct-drawing method, in a case where an incident beam diameter is reduced, resolution of a display image is reduced. Thus, the incident beam diameter cannot be made too thin. For example, resolution display corresponds to eyesight of 0.5 in a case where the beam diameter is approximately 0.75 mm. Thus, a problem practically occurs in many cases when the incident beam diameter is further reduced.

When an HMD using the retinal direct-drawing method or a virtual image display method having a narrow eyebox is mounted on the head of the user, there is also a problem of resolving a viewable position due to individual differences. A shape and size of a human head, a pupillary distance, and pupil positions based on hollows of eyes (so-called chiseled feature) have individual differences such as not only race, gender, age, and the like, but also hair style and body shape. Thus, even in a case where mounting of the HMD on the head is fixed by, for example, a headband or the like, it is necessary to adjust hardware to the pupil position after the HMD is mounted so as to visually recognize an image. For this, it is necessary to physically match the focal position of the projection system that collects a bundle of light beams of the display image with the pupil position. Thus, it is basically impossible to move an image display position in a software manner.

In this case, a wearer generally performs an operation by himself/herself to adjust the mounting position so as to view video. However, as described above, the position is pinpoint, and thus it is extremely difficult to adjust the position. Further, the wearer himself/herself determines whether or not the mounting position has been adjusted to a position where the entire image can be viewed. Therefore, it is extremely difficult for a person who assists in wearing to appropriately adjust the display position instead. That is, in a case where the wearer has physical disabilities (in particular, disabilities with hands, vision impairment (amblyopia), and hearing impairment) or in a case where the wearer cannot sufficiently communicate or explain a situation (young children, elderly people, other languages, and the like), it is extremely difficult for the wearer to operate an adjustment mechanism so as to view an image.

Further, the problem of mounting displacement also affects a line-of-sight detection function. Line-of-sight detection using a camera method has a problem that accuracy decreases when a positional relationship between the pupil and the camera and light source (frame) of the eyewear changes after initial calibration. Therefore, recalibration is required. Further, in order to accurately acquire a Purkinje image, signal processing such as stray light removal is also required, and there is an influence of, for example, displacement of the mounting position caused by a motion.

In the PD method, a change in the amount of reflected light from the eyeball is read, and thus, even in a case where mounting displacement occurs in the position of the eyeball due to a motion operation, the displacement cannot be distinguished from the eye movement in the first place. Therefore, the displacement from an initial mounting position is not allowed. In order to cause those line-of-sight detection mechanisms to function correctly, it is desirable that the HMD itself can detect how much mounting displacement from the initial mounting position occurs due to a motion operation.

Further, the HMD has a general problem of being desirably light and small in order to enhance wearability. Meanwhile, basic components of the HMD include an HMD main body (e.g. a fixing unit to the head, a band, a belt, and an eyeglass frame), a mounting position adjustment mechanism, and an image display unit (e.g. an optical system that presents an image or information to the eye, an image light source, and a light source operation unit). The HMD includes not only the above configuration but also components such as the line-of-sight detection mechanism (which detects the line-of-sight or movement of the pupil of the eyeball; e.g. camera, PD, and light source) and a line-of-sight tracking mechanism (a mechanism that moves the image display unit in accordance with movement of the eye; e.g. actuator, piezoelectric element, and bimetal) for presentation of AR information. This tends to increase the weight of the device.

Because the weight of the device tends to increase as described above, the moment of inertia and the like increase. As a result, even after the positional relationship between the HMD and the head is correctly determined such that an image can be viewed and initial calibration of the line-of-sight detection function is performed, mounting displacement after wearing is likely to occur due to a motion operation. Here, the mounting displacement caused by the motion indicates displacement that changes the positional relationship between the HMD and the eyeball due to the above motion operation or the like after mounting displacement is corrected at the time of wearing (which is corrected by calibration at the time of wearing; also referred to as initial alignment adjustment).

As an example, when an amount of mounting displacement caused by a motion was measured by using an HMD having a device weight of approximately 130 g to 600 g, the amount of displacement was approximately 3 mm at maximum (range of approximately 1 to 3 mm), and calibration needed to be performed again. Therefore, in the image display method using the retinal direct-drawing method, in particular, even the amount of displacement of approximately 1 mm may cause a problem. Thus, it is important to accurately grasp the amount of mounting displacement and manage the mounting state.

Examples of the shape of the HMD include an eyeglass type, a goggle type, a helmet type, a monocular type, and a binocular type. In order to secure the accuracy of the line-of-sight detection and to stably wear the HMD for a long time, any of the shapes of the HMD is required to be firmly fixed to the head. Thus, the HMD is generally fixed by some fixing method, for example, by sandwiching and tightening the head with a fixing band or the like.

However, although it is necessary to firmly attach the HMD to the head, the shape of the head and hair style of the user are individually different, and thus it is difficult for the user himself/herself to determine how much the band should be tightened to prevent displacement in tightening adjustment or the like of the band. At the time of initial wearing in particular, it is necessary to get used to wearing. Further, in a case where the tightening is performed more than necessary, blood flow stops, and the HMD cannot be mounted for a long time. Thus, the HMD is mounted with appropriate fixing force (amount of tightening or cushioning material=pad). Therefore, the mounting displacement caused by the motion operation is more likely to occur.

Further, in a case where the tightening is insufficient and the mounting displacement occurs, the wearer does not know a moving direction of the mounting displacement and the amount of displacement in a case where the wearer cannot view the image. Thus, in a case where the wearer cannot view the display image, the wearer does not know in which direction and how much the HMD should be moved to view the image.

Here, a general procedure of calibration at the time of wearing (initial calibration) until the HMD is mounted on the head of the user will be described below.

As a first step, the HMD is temporarily mounted on the head. As a second step, a position of a display device of the HMD is adjusted with respect to the head such that a projection image can be viewed. At this time, a marker or the like for position adjustment may be displayed on the HMD. As a third step, when a position where the image can be viewed well is determined, the HMD is finally fixed by using a fixing mechanism to the head (generally, a tightening mechanism using a belt or the like; however, an eyeglass-shaped or other shapes of HMDs do not include a fixing mechanism in some cases). If necessary, this work may be performed by a manual fine movement adjustment mechanism or may be automatically adjusted by a motor or the like. As a fourth step, the position where the entire image can be viewed is set as an initial position and is stored in the line-of-sight tracking mechanism, the line-of-sight detection mechanism, or the like. As a fifth step, when it is confirmed that the line-of-sight can be detected and tracked according to a set value, the processing ends. If there is no sufficient accuracy for the final fixation, the second step to the fifth step are repeated.

After the above procedure, in a case where the positional relationship between the HMD and the head changes (in a case where the positional relationship is displaced due to a motion or the like=mounting displacement), it is necessary to perform calibration again. As the procedure at this time, generally, the second step to the fifth step are repeated. Therefore, when the mounting displacement occurs, the line-of-sight detection accuracy of a currently used application may decrease in a case where recalibration is not performed. Accordingly, determining in which direction and how much the mounting displacement has occurred is useful information.

As to the above problems, the use of the image display device 100 according to the present embodiment makes it possible to guide the mounting state of the head-mounted image display device using the retinal direct-drawing method to the visually recognizable region that is a correct design position.

(4) Example of focal position adjustment function of image display device 100

Next, an example of a focal position adjustment function of the image display device 100 will be described with reference to FIGS. 5, 6A, 6B, and 6C. FIG. 5 is a schematic diagram illustrating a configuration example of the optical system of the image display device 100.

As illustrated in FIG. 5, at least two cameras 104R-1 and 104R-2 are arranged near both ends of the combiner 113R serving as the projection system in the image display device 100 that is an HMD using the retinal direct-drawing method. The number of those cameras is not limited to two and may be three or more. In the image display device 100, a position where the optical axes of the camera lenses of the cameras 104R-1 and 104R-2 intersect each other and the focal position of the combiner 113R are adjusted in advance so as to match with each other. The only one matching position is present in the retinal direct-drawing method.

FIGS. 6A, 6B, and 6C a are schematic diagrams illustrating the focal position adjustment function on the right eye side of the image display device 100. FIG. 6A illustrates a captured image of the eyeball by the camera 104R-2, and FIG. 6B illustrates a captured image of the eyeball by the camera 104R-1. FIG. 6C illustrates a captured image of the eyeball when the position where the optical axes of the cameras 104R-1 and 104R-2 intersect each other and the focal position of the combiner match with each other after position adjustment is performed.

As illustrated in FIG. 6A, in a case where the optical axis of the camera 104R-2 matches with the focal position of the combiner, the position adjustment is OK for the camera 104R-2. As illustrated in FIG. 6B, in a case where the optical axis of the camera 104R-1 does not match with the focal position of the combiner, the position adjustment is failure for the camera 104R-1. Therefore, the mounting position is adjusted while viewing the captured image such that the optical axis of the camera 104R-1 matches with the focal position of the combiner. Further, as illustrated in FIG. 6C, when the position where the optical axes of the cameras 104R-1 and 104R-2 intersect each other and the focal position of the combiner match with each other, the position adjustment is OK. Therefore, it is possible to mount the image display device 100 on the head of the user so as to reliably view the field of view.

In the retinal direct-drawing method, the visually recognizable region is extremely narrow and exists only at a pinpoint, and thus it is difficult to adjust the position at a pinpoint. However, the image display device 100 adjusts the mounting position by using the fact that the adjustment position is uniquely determined.

(5) Mounting Operation Example of Image Display Device 100

Figure 7:
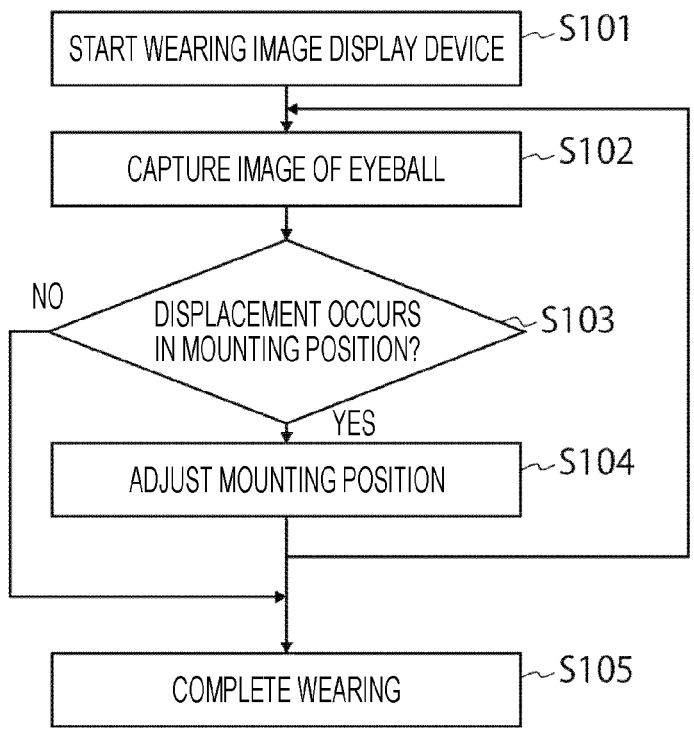
FIG. 7 is a flowchart showing a mounting operation example of the image display device according to the first embodiment of the present technology.

Next, an operation example of mounting the image display device 100 on the head of the user will be described with reference to FIG. 7. FIG. 7 is a flowchart showing a mounting operation example of the image display device 100.

In step S1, the wearer who is the user faces the front and starts wearing the image display device 100.

In step S2, each of the cameras 104R-1 and 104R-2 captures an image of the eyeball of the wearer to acquire a captured image.

In step S3, the mounting displacement determination unit 181 calculates a direction and amount of displacement on the basis of the captured images of the respective eyeballs captured by the cameras 104R-1 and 104R-2 and determines whether or not displacement occurs in a mounting position of the wearer. When the displacement occurs (YES), the processing proceeds to step S4. When the displacement does not occur (NO), the processing proceeds to step S5, and wearing is completed.

In step S4, the wearer receives an instruction on an adjustment direction based on information regarding the mounting displacement from the image display device 100 and adjusts the mounting position. When the mounting position can be adjusted at a position with no displacement, the processing proceeds to step S5, and wearing is completed. If the mounting position is still displaced even after the adjustment, the mounting displacement is further determined, and the mounting position is adjusted again.

As described above, the image display device 100 receives an instruction on the adjustment direction based on the mounting displacement information and adjusts the mounting position. This makes it possible to greatly reduce an initial wearing time.

According to the image display device 100 of the present embodiment, both the wearer and the wearing assistant other than the wearer can adjust a position of mounting displacement while viewing a captured image of the camera 104L-1, 104L-2, 104R-1 and 104R-2 on a monitor. Therefore, the assistant can assist in wearing even in a case where the wearer uses the image display device for the first time, that is, is not used to wear the image display device, has physical disabilities, or has difficulty in communication. Therefore, the image display device 100 can guide the mounting state of the head-mounted image display device 100 to the visually recognizable region that is a correct design position.

Further, the image display device 100 can detect displacement of the mounting position due to a motion after wearing. Further, because the image display device 100 can find a direction of displacement, the wearer can easily wear the image display device again in response to an instruction from the image display device 100 and also correct the position by using a tracking mechanism. Furthermore, the image display device 100 can measure an interpupillary distance (IPD) by setting one eye as a reference. Thus, it is also possible to initially adjust the interpupillary distance.

Further, the image display device 100 can be mounted only by viewing the image of the eyeball even in a case where a target image cannot be viewed (even in a case where the target image is not displayed) and can also have a simple line-of-sight detection function. Further, the wearer does not determine whether or not the wearer can visually recognize an image, and thus automatic wearing alignment can be performed only by the image display device 100. Further, in a case where the shape of the head of the user is measured in advance, the image display device 100 can be customized for individuals before shipment.

2. Second Embodiment

Figure 8:
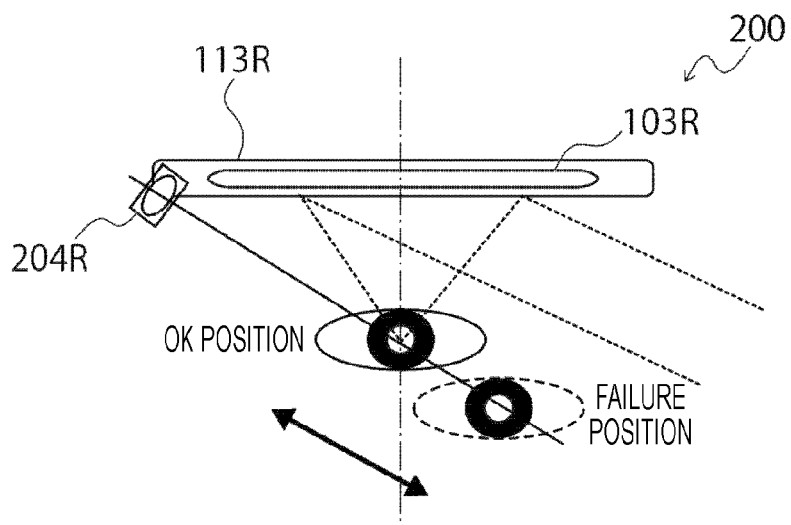
FIG. 8 is a schematic diagram illustrating a configuration example of an optical system of an image display device according to a second embodiment of the present technology.

Next, an image display device according to a second embodiment of the present technology will be described with reference to FIG. 8. FIG. 8 is a schematic diagram illustrating a configuration example of an optical system of an image display device 200 according to the present embodiment. The image display device 200 is different from the image display device 100 according to the first embodiment in that the image display device 200 includes only one camera that captures an image of the eyeball of the user. Other points of the present embodiment are similar to those of the first embodiment.

As illustrated in FIG. 8, in the image display device 200, one camera 204R is arranged near both ends of a combiner 113R serving as a projection system. The camera 204R that captures an image of the eyeball of the user may be only one camera as long as the camera can detect depth information in the Z-axis direction. As an example, a light field camera, a monocular time-division camera, a TOF sensor, a phase difference information acquisition sensor for AF, or the like can be applied to the camera 204R.

The image display device 200 according to the present embodiment can obtain an effect similar to that of the image display device 100 according to the first embodiment, and a mounting state of the head-mounted image display device 200 can be guided to a visually recognizable region that is a correct design position. Further, because the image display device 200 includes only one camera 204R as an image sensor, it is possible to hardly cause mounting displacement while contributing to reduction in size and weight. Furthermore, the image display device 200 can achieve low power consumption and thus can be driven and worn for a long time.

3. Third Embodiment

Next, an image display device according to a third embodiment of the present technology will be described with reference to FIGS. 9A and 9B. FIG. 9A is a schematic diagram illustrating a configuration example of an optical system of an image display device 300 according to the present embodiment. FIG. 9B is a schematic diagram illustrating a Purkinje image P1 captured by the image display device 300. The image display device 300 is different from the image display device 100 according to the first embodiment in that the image display device 300 includes one camera that captures an image of the eyeball of the user and a light source corresponding to a second camera. Other points of the present embodiment are similar to those of the first embodiment.

As illustrated in FIGS. 9A and 9B, in the image display device 300, one camera 304R is arranged near one end of a combiner 113R serving as a projection system, and a light source unit 301 is arranged near the other end of the combiner 113R at a position equivalent to the second camera. That is, the image display device 300 includes the light source unit 301 arranged at a position symmetrical to the camera 304R (imaging element) with respect to the visually recognizable region.

The image display device 300 that captures an image of the eyeball of the user captures an image of a first Purkinje image (corneal reflected light) P1. The first Purkinje image P1 appears at a position uniquely determined by positions of the camera 304R, the light source unit 301, and the eyeball, and thus the image display device 300 can measure the position of the eyeball even in a case where the only one camera 304R is provided.

The image display device 300 according to the present embodiment can obtain an effect similar to that of the image display device 100 according to the first embodiment, and a mounting state of the head-mounted image display device 300 can be guided to the visually recognizable region that is a correct design position. Here, a line-of-sight detection method using the Purkinje image assumes that positions of the image sensor, the light source, and the eyeball (pupil) do not change. Thus, the line-of-sight detection accuracy decreases when mounting displacement occurs. In view of this, the image display device 300 has a function of determining mounting displacement and therefore can more stably detect the line-of-sight.

4. Fourth Embodiment

Next, an image display device according to a fourth embodiment of the present technology will be described with reference to FIG. 10. FIG. 10 is a schematic diagram illustrating a configuration example of an optical system of an image display device 400 according to the present embodiment. The image display device 400 is different from the image display device 100 according to the first embodiment in that the image display device 400 includes two imaging elements having a function of switching an imaging range. Other points of the present embodiment are similar to those of the first embodiment.

As illustrated in FIG. 10, in the image display device 200, cameras 404R-1 and 404R-2 are arranged near both ends of a combiner 113R_serving as a projection system. The cameras 404R-1 and 404R-2 are cameras for acquiring external information, into which a flip or an element (e.g. mirror or prism) for switching an optical path is inserted.

In a case of capturing an image of the eyeball, the image display device 200 captures an image by directing the cameras 404R-1 and 404R-2 toward the eyeball by using the flip or the inserted element. Further, in a case of capturing an image of the external information, the image display device 200 moves the cameras 404R-1 and 404R-2 to positions of cameras 404R-11 and 404R-12 by using the flip or the inserted element and then captures an image.

The image display device 400 according to the present embodiment can obtain an effect similar to that of the image display device 100 according to the first embodiment, and a mounting state of the head-mounted image display device 400 can be guided to the visually recognizable region that is a correct design position. The HMD is generally used to capture an image of the outside world and superimpose a display image of the HMD on external video. However, in a case where there is no intense motion (surgery, standing work, or wearing the HMD while sitting on a wheelchair or chair), mounting displacement caused by a motion hardly occurs. In view of this, the image display device 400 uses the cameras 404R-1 and 404R-2 for capturing an image of the outside world after assisting in wearing, thereby reducing the number of sensors. This makes it possible to reduce power consumption and weight.

5. Fifth Embodiment

Figure 11:
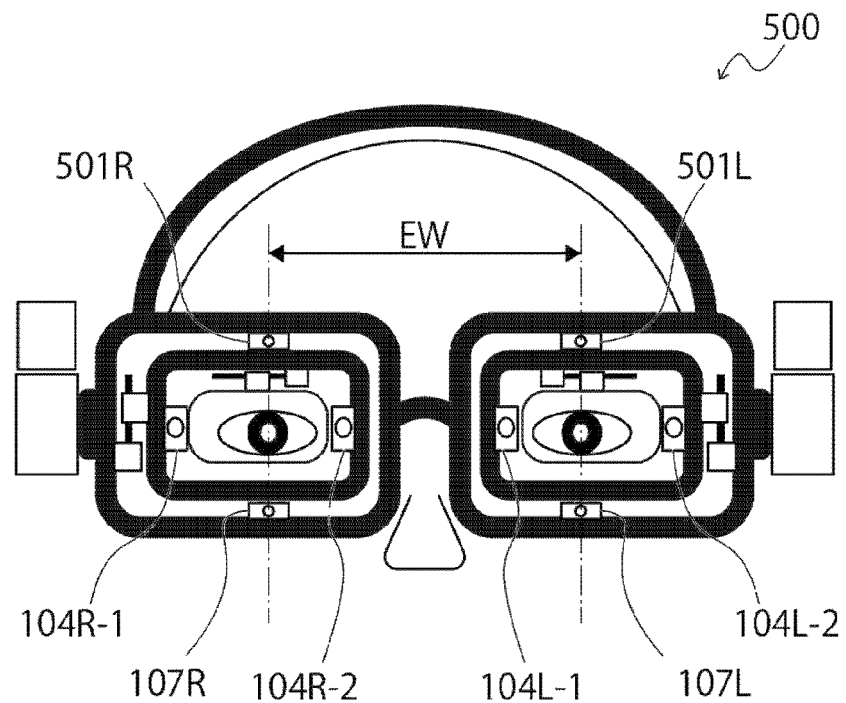
FIG. 11 is a front view illustrating a configuration example of an image display device according to a fifth embodiment of the present technology.

Next, an image display device according to a fifth embodiment of the present technology will be described with reference to FIG. 11. FIG. 11 is a front view illustrating a configuration example of an image display device 500 according to the present embodiment. The image display device 500 is different from the image display device 100 according to the first embodiment in that the image display device 500 includes line-of-sight detection units above and below the eyeballs of both the eyes of the user. Other points of the present embodiment are similar to those of the first embodiment.

As illustrated in FIG. 11, the image display device 500 includes two imaging elements that are the line-of-sight detection units 107L and 107R below the pupils of the eyeballs of both the eyes. Further, the image display device 500 includes two imaging elements that are line-of-sight detection units 501L and 501R above the pupils of the eyeballs of both the eyes. The line-of-sight detection units 107L and 107R and the line-of-sight detection units 501L and 501R are arranged at vertically symmetrical positions with respect to the pupils, respectively.

The image display device 500 according to the present embodiment can obtain an effect similar to that of the image display device 100 according to the first embodiment and can also accurately measure a value of an interpupillary distance (IPD) EW. The value of the interpupillary distance does not change as long as the value is a value of the same person unless the person grows (values of adults do not change). Therefore, when acquiring an individual interpupillary distance as information, the image display device 500 does not need to adjust the interpupillary distance at the time of next wearing on the basis of the information, thereby greatly reducing a time until wearing is completed.

6. Sixth Embodiment

Next, an image display device according to a sixth embodiment of the present technology will be described. The image display device according to the present embodiment has a function of displaying a camera image on an external monitor. Other points of the present embodiment are similar to those of the first embodiment.

The image display device according to the present embodiment can physically and uniquely detect a positional relationship between the HMD and the head (pupil). Therefore, both the wearer and the wearing assistant other than the wearer can adjust a mounting position while viewing a camera image on the monitor. Therefore, the assistant can assist in wearing even in a case where the wearer uses the image display device for the first time, that is, is not used to wear the image display device, has physical disabilities, or has difficulty in communication. According to the image display device of the present embodiment, a person other than the wearer who cannot view a display image of the HMD can accurately perform wearing work at a correct position, without viewing (regardless of) the display image of the HMD.

7. Seventh Embodiment

Next, an image display device according to a seventh embodiment of the present technology will be described. The image display device according to the present embodiment has a dedicated projection position adjustment mechanism for adjusting a mounting position or an eyeball tracking function of eye tracking. Other points of the present embodiment are similar to those of the first embodiment.

The image display device according to the present embodiment does not require the wearer to view an image, and thus a wearing mechanism can be automated on the basis of acquired information.

8. Eighth Embodiment

Next, an image display device according to an eighth embodiment of the present technology will be described. The image display device according to the present embodiment has a function of measuring a change in positions of an HMD frame and the head, such as a mounting displacement caused by a motion after calibration at the time of wearing, and feeding back a numerical value thereof to an application. Other points of the present embodiment are similar to those of the first embodiment.

The image display device according to the present embodiment stores, for example, various correction coefficients (tables) according to an amount of mounting displacement in advance as content of the feedback to the application and has a function of automatically selecting a correction table every time the amount of mounting displacement changes or a function of returning the position to a predetermined position by using an eye tracking mechanism or an automatic position adjustment function, for example, under a condition that display is partially missing in a case where a mounting position is displaced by a certain amount.

9. Ninth Embodiment

Next, an image display device according to a ninth embodiment of the present technology will be described. The image display device according to the present embodiment has a function of receiving feedback of an amount of displacement (offset value) from a design value acquired at the time of wearing. Other points of the present embodiment are similar to those of the first embodiment.

The image display device according to the present embodiment measures and stores, for example, an adjustment amount of the interpupillary distance (IPD) and an adjustment amount of an individual initial position at the time of wearing and thus can reduce adjustment time by calling adjustment amounts of the individual in a case where a plurality of users uses the same HMD. The visually recognizable region (eyebox) with respect to a frame is known in advance as mechanical design information, and thus it is possible to determine at which position the visually recognizable region is present with respect to the head and can feed back a determination result. The image display device according to the present embodiment can store a value acquired by the image display device 500 according to the fifth embodiment or a value of the interpupillary distance measured in advance.

10. Tenth Embodiment

Next, an image display device according to a tenth embodiment of the present technology will be described. The image display device according to the present embodiment has a function of fixing the head with a band such as a cushioning material (pad) in order to improve wearing comfort. Other points of the present embodiment are similar to those of the first embodiment.

In the image display device according to the present embodiment, even in a case where there is an individual difference in the shape of the head, it is possible to wear the image display device with certain fixing force (tightening force). Thus, it is possible to maintain comfort at the time of wearing for a long time and appropriately suppress the amount of mounting displacement, without tightening the head more than necessary.

11. Eleventh Embodiment

Next, an image display device according to an eleventh embodiment of the present technology will be described. The image display device according to the present embodiment includes a line-of-sight tracking mechanism that tracks rotational movement of the line-of-sight. Other points of the present embodiment are similar to those of the first embodiment.

The image display device according to the present embodiment can have a function of feeding back an amount of movement of the eyeball to the line-of-sight tracking mechanism that tracks the rotational movement of the line-of-sight.

12. Twelfth Embodiment

Next, an image display device according to a twelfth embodiment of the present technology will be described. The image display device according to the present embodiment includes a line-of-sight tracking mechanism that tracks movement of the line-of-sight and a line-of-sight detection mechanism. The line-of-sight detection mechanism may be a line-of-sight detection function by the photodiode (PD) method. Other points of the present embodiment are similar to those of the first embodiment.

The line-of-sight detection function using the PD method includes a line-of-sight tracking feedback control unit having a function of obtaining information from a function of feeding back an amount of position displacement and improving detection accuracy. The control unit stores a line-of-sight correction value to be fed back for each amount of mounting displacement in advance, thereby improving the detection accuracy of the line-of-sight direction. The PD method uses a difference in reflectance between the iris (pupil) and the white of the eye (sclera) and detects, by the PD, a change in an amount of reflected light caused by a change in a ratio of the iris to the white of the eye due to rotational movement of the eyeball.

The image display device according to the present embodiment can uniquely detect the line-of-sight direction in a case where a positional relationship between the PD and a light source and the eyeball does not change, but, in a case where mounting displacement occurs, the image display device performs correction thereof, thereby maintaining accuracy. The PD itself cannot determine a difference between the mounting displacement and movement of the line-of-sight. In view of this, the image display device according to the present embodiment can determine the mounting displacement, thereby improving the accuracy of the line-of-sight detection.

13. Thirteenth Embodiment

Next, an image display device according to a thirteenth embodiment of the present technology will be described. The image display device according to the present embodiment includes an HOE combiner of the retinal direct-drawing method. The HOE combiner is advantageous in see-through display and can superimpose an image on the outside world. Other points of the present embodiment are similar to those of the first embodiment.

The image display device according to the present embodiment can feed back an amount of mounting displacement and therefore can superimpose an AR image on the outside world with high accuracy.

14. Fourteenth Embodiment

Next, an image display system including an image display device according to a fourteenth embodiment of the present technology will be described. The image display system according to the present embodiment includes the image display device according to each of the above embodiments and an information presentation device that presents operation assistance information using the image display device.

The image display system according to the present embodiment is an application system having a function of presenting information regarding operation assistance (teaching, navigation, and game) or the like using the image display device according to each of the above embodiments. The image display system according to the present embodiment uses any of the image display devices according to the above respective embodiments which detect mounting displacement and thus can correct mounting displacement during a motion that is likely to occur in an application involving a motion operation. Therefore, it is possible to achieve an application or device capable of performing satisfactory image display.

15. Other Configurations

The image display device according to the present technology may have a monocular (either right eye or left eye) configuration. Further, it is unnecessary to directly view the outside world as in, for example, video see-through. In this case, an AR image is superimposed on the outside world in many cases, and thus the accuracy of detecting the line-of-sight is particularly important. Therefore, the configuration of any of the present embodiments can accurately adjust the pupil position to a design value, thereby performing suitable superimposition. Further, the image display device according to the present technology may have a shape (a shape of a helmet or the like) including a fixing unit that covers the entire head. The image display device according to the present technology is particularly suitable because mounting displacement is likely to occur when the weight thereof is relatively heavy.

The image display device according to the present technology can use not only the retinal direct-drawing method but also the virtual image method having a narrow eyebox. Further, the image display device according to the present technology is particularly suitable in a case where an HMD has a display area with a wide angle of view, and a size of the eyebox has substantially the same as a size of the pupil. Furthermore, because the wearer does not need to view an image, the image display device according to the present technology has a function of grasping information regarding the shape of the head of the wearer in advance. Therefore, the adjustment mechanism of the image display device according to the present technology can also be customized for individuals at the stage of manufacturing (before shipment).

The present technology is not limited to the configuration of the above embodiments and can be applied to an image display device and an image display system having a function of detecting the positional relationship between the HMD frame and the head (face) and enabling appropriate visual recognition even by a method with an extremely small eyebox of the HMD as long as the pupil position can be guided to a mounting position having a design value.

16. Hardware Configuration Example

Figure 12:
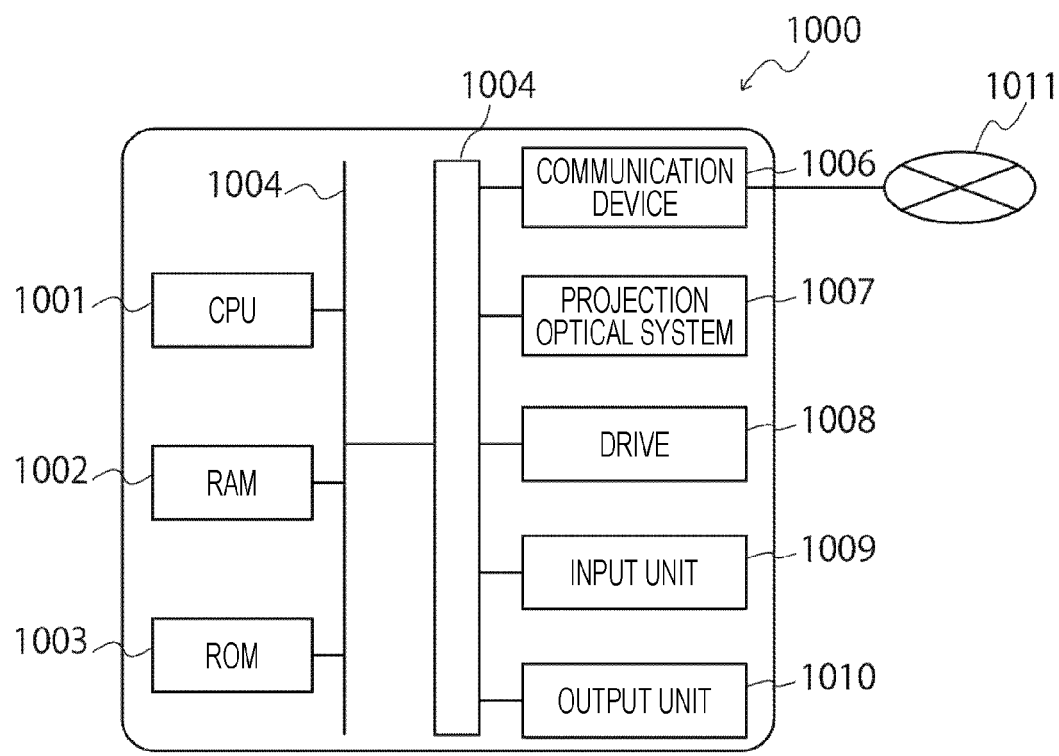
FIG. 12 illustrates a schematic hardware configuration example of an information processing device that achieves an image display device or image display system according to the present technology.

Hereinafter, an example of a hardware configuration of an information processing device that achieves the image display device or image display system according to the present technology will be described with reference to FIG. 12. FIG. 12 illustrates a schematic hardware configuration example of the information processing device that achieves the image display device or image display system according to the present technology.

An information processing device 1000 in FIG. 12 includes a central processing unit (CPU) 1001, a RAM 1002, and a ROM 1003. The CPU 1001, the RAM 1002, and the ROM 1003 are mutually connected via a bus 1004 and are also connected to other components of the information processing device 1000 via the bus 1004.

The CPU 1001 controls and calculates the information processing device 1000. An arbitrary processor can be used as the CPU 1001, and examples thereof include processors of Xeon (registered trademark) series, Core (trademark) series, or Atom (trademark) series. Each component of the image display device or the image display system according to the present technology described above is implemented by, for example, the CPU 1001.

The RAM 1002 includes, for example, a cache memory and a main memory and may temporarily store programs and the like used by the CPU 1001. The ROM 1003 can write data only once and can only read stored data at the time of use.

The information processing device 1000 may include a communication device 1006, a projection optical system 1007, a drive 1008, an input unit 1009, and an output unit 1010. Any of those components can be connected to the bus 1004.

The communication device 1006 connects the information processing device 1000 to a network 1011 in a wired or wireless manner. The communication device 1006 is a device that can communicate with a database and a terminal via the network 1011. A type of the communication device 1006 may be selected as appropriate by those skilled in the art.

The projection optical system 1007 adjusts a direction of video display light such that the video display light reaches a desired region and/or position of the holographic optical element (HOE). For example, the video display light scanned by the scanning mirror is converted into parallel light.

The drive 1008 can read information recorded in a recording medium, output the information to the RAM 1003, and/or write various types of data in the recording medium. The recording medium is, for example, a DVD medium, a flash memory, or an SD memory card, but is not limited thereto.

The input unit 1009 is a configuration for the user (e.g. wearer) to operate the information processing device 1000. Examples of the input unit 1009 include a mouse and a keyboard, but are not limited thereto.

The output unit 1010 can output a processing result by the information processing device 1000. Examples of the output unit 1010 include a display device such as a display, an audio output device such as a speaker, and a printer, but are not limited thereto.

Note that the present technology can have the following configurations.

(1)

A head-mounted image display device including an image acquisition unit that acquires a positional relationship image from which a positional relationship between a pupil position of an eyeball of a user and a visually recognizable region of the user can be estimated.

(2)

The image display device according to (1), further including a projection system onto which incident light is projected, in which the visually recognizable region is a focal position of the projection system.

(3)

The image display device according to (1) or (2), further including:

a mounting displacement determination unit that determines an amount and/or direction of displacement from a correct mounting state on the basis of information from the positional relationship image; and an information presentation unit that presents mounting position adjustment information to a user or a wearing assistant on the basis of a determination result by the mounting displacement determination unit.

(4)

The image display device according to any one of (1) to (3), in which an image display method is a retinal direct-drawing method or a virtual image method in which a size of the visually recognizable region is substantially the same as a size of a pupil diameter.

(5)

The image display device according to any one of (1) to (4), in which:

the image acquisition unit includes an imaging element; and the imaging element acquires the three-dimensional positional relationship image.

(6)

The image display device according to (5), further including a light source arranged at a position symmetrical to the imaging element with respect to the visually recognizable region.

(7)

The image display device according to (5), in which the imaging element has a function of switching an imaging range.

(8)

The image display device according to any one of (1) to (7), in which:

the image acquisition unit includes a plurality of imaging elements; and optical axes of the imaging elements intersect each other in the visually recognizable region.

(9)

The image display device according to any one of (1) to (8), further including a line-of-sight detection unit that detects a line-of-sight of the user.

(10)

The image display device according to any one of (1) to (9), in which the line-of-sight detection unit detects the line-of-sight of the user by an imaging method or a photodiode method.

(11)

The image display device according to (9), further including a holographic optical element that diffracts or transmits incident light, in which the line-of-sight detection unit detects the line-of-sight of the user by the photodiode method.

(12)

The image display device according to any one of (1) to (11), further including a line-of-sight tracking unit that tracks a line-of-sight of the user.

(13)

The image display device according to any one of (1) to (12), further including a feedback control unit that feeds back information based on the positional relationship image.

(14)

The image display device according to (9), further including a feedback control unit that feeds back information based on the positional relationship image, in which the line-of-sight detection unit corrects an amount of mounting displacement on the basis of a feedback signal acquired from the feedback control unit.

(15)

The image display device according to (12), further including
a feedback control unit that feeds back information based on the positional relationship image, in which
the line-of-sight tracking unit tracks the line of sight by receiving a feedback signal in which an amount of mounting displacement has been corrected from the feedback control unit.

(16)

The image display device according to any one of (1) to (15), in which
a shape of the image display device is any one of an eyeglass type, a goggle type, a helmet type, a monocular type, and a binocular type.

(17)

The image display device according to (3), in which
the information presentation unit issues an instruction regarding the mounting state by presenting information such as video or sound at a time of wearing and during wearing.

(18)

An image display system including:
a head-mounted image display device including an image acquisition unit that acquires a positional relationship image from which a positional relationship between a pupil position of an eyeball of a user and a visually recognizable region of the user can be estimated; and
an information presentation device that presents operation assistance information using the image display device.

REFERENCE SIGNS LIST

100, 200, 300, 400, 500 Image display device
101, 301 Light source unit
102 Projection optical system
103 Holographic optical element (HOE)
104L-1, 104L-2, 104R-1, 104R-2; 204R, 304R, 404R-1, 404R-2104, 204, 304, 404
Camera (image acquisition unit)
105 Line-of-sight tracking unit
106 Inner rim portion
107, 501 Line-of-sight detection unit
108 Outer rim portion
109 Temple portion
110 Bridge portion
111 Headband portion
112 Control unit
120 Laser light source
121, 122 Reflective mirror
123 Scanning mirror
181 Mounting displacement determination unit
182 Information presentation unit
183 Feedback control unit
184 Storage unit

The invention claimed is:

1. A head-mounted image display device, comprising
an image acquisition unit configured to acquire a positional relationship image from which a positional relationship between a pupil position of an eyeball of a user and a visually recognizable region of the user is estimated; and
an information presentation unit configured to present mounting position adjustment information to the user or a wearing assistant.

2. The head-mounted image display device according to claim 1, further comprising
a projection system onto which incident light is projected, wherein
the visually recognizable region is a focal position of the projection system.

3. The head-mounted image display device according to claim 1, further comprising:
a mounting displacement determination unit configured to determine at least one of an amount or a direction of displacement from a correct mounting state based on information from the positional relationship image, wherein
the mounting position adjustment information is presented to the user or the wearing assistant, based on a determination result by the mounting displacement determination unit.

4. The head-mounted image display device according to claim 3, wherein
the information presentation unit is further configured to issue an instruction regarding the correct mounting state by presentation of information such as video or sound at a time of wearing and during wearing.

5. The head-mounted image display device according to claim 1, wherein
an image display method is a retinal direct-drawing method or a virtual image method in which a size of the visually recognizable region is same as a size of a pupil diameter.

6. The head-mounted image display device according to claim 1, wherein
the image acquisition unit includes an imaging element; and
the imaging element is configured to acquire the positional relationship image.

7. The head-mounted image display device according to claim 6, further comprising
a light source at a position symmetrical to the imaging element with respect to the visually recognizable region.

8. The head-mounted image display device according to claim 6, wherein
the imaging element has a function of switching an imaging range.

9. The head-mounted image display device according to claim 1, wherein
the image acquisition unit includes a plurality of imaging elements; and
optical axes of the plurality of imaging elements intersect with each other in the visually recognizable region.

10. The head-mounted image display device according to claim 1, further comprising
a line-of-sight detection unit configured to detect a line-of-sight of the user.

11. The head-mounted image display device according to claim 10, wherein
the line-of-sight detection unit is further configured to detect the line-of-sight of the user by one of an imaging method or a photodiode method.

12. The head-mounted image display device according to claim 9, further comprising
a holographic optical element configured to one of diffract or transmit incident light, wherein
the line-of-sight detection unit is further configured to the line-of-sight of the user by a photodiode method.

13. The head-mounted image display device according to claim 10, further comprising a feedback control unit configured to feed back information based on the positional relationship image, wherein the line-of-sight detection unit is further configured to correct an amount of mounting displacement based on a feedback signal acquired from the feedback control unit.

14. The head-mounted image display device according to claim 1, further comprising a line-of-sight tracking unit configured to track a line-of-sight of the user.

15. The head-mounted image display device according to claim 14, further comprising a feedback control unit configured to feed back information based on the positional relationship image, wherein the line-of-sight tracking unit is further configured to track the line-of-sight by a feedback signal, in which an amount of mounting displacement is corrected, from the feedback control unit.

16. The head-mounted image display device according to claim 1, further comprising a feedback control unit configured to feed back information based on the positional relationship image.

17. The head-mounted image display device according to claim 1, wherein a shape of the head-mounted image display device is one of an eyeglass type, a goggle type, a helmet type, a monocular type, or a binocular type.

18. An image display system, comprising:

a head-mounted image display device including an image acquisition unit, wherein the image acquisition unit is configured to acquire a positional relationship image from which a positional relationship between a pupil position of an eyeball of a user and a visually recognizable region of the user is estimated; and an information presentation device configured to present operation assistance information using the head-mounted image display device.

\* \* \* \* \*